United States Patent  (10) Patent No.: US 7,792,017 B2
Lu et al.  (45) Date of Patent: Sep. 7, 2010

(54) VIRTUAL LOCAL AREA NETWORK CONFIGURATION FOR MULTI-CHASSIS NETWORK ELEMENT

(75) Inventors: Biao Lu, Cupertino, CA (US); Vinay Ravuri, Santa Clara, CA (US); How Tung Lim, San Jose, CA (US); Kamran Farshchi, Wexford, PA (US)

(73) Assignee: Infinera Corporation, Sunnyvale, CA (US)

( * ) Notice: Subject to any disclaimer, the term of this patent is extended or adjusted under 35 U.S.C. 154(b) by 524 days.

(21) Appl. No.: 11/380,705

(22) Filed: Apr. 28, 2006

(65) Prior Publication Data

US 2007/0019642 A1 Jan. 25, 2007

Related U.S. Application Data

(60) Provisional application No. 60/693,895, filed on Jun. 24, 2005.

(51) Int. Cl.
*H04L 12/26* (2006.01)
*H04L 12/28* (2006.01)

(52) U.S. Cl. .................. 370/217; 370/392; 370/401

(58) Field of Classification Search ......... 370/216–220, 370/351, 389, 392, 400, 401
See application file for complete search history.

(56) References Cited

U.S. PATENT DOCUMENTS

| 6,167,052 | A | 12/2000 | McNeill et al. |
| 6,470,025 | B1* | 10/2002 | Wilson et al. ............... 370/462 |
| 6,751,191 | B1* | 6/2004 | Kanekar et al. ............. 370/217 |
| 6,804,236 | B1 | 10/2004 | Mahajan et al. |
| 6,826,158 | B2* | 11/2004 | Seaman et al. .............. 370/254 |
| 6,894,999 | B1* | 5/2005 | Acharya ..................... 370/352 |
| 7,362,700 | B2* | 4/2008 | Frick et al. .................. 370/219 |
| 7,391,719 | B2* | 6/2008 | Ellis et al. ................... 370/219 |
| 2003/0048746 | A1* | 3/2003 | Guess et al. ................ 370/219 |
| 2003/0223358 | A1* | 12/2003 | Rigby et al. ................ 370/218 |
| 2005/0078685 | A1* | 4/2005 | MacLean et al. ....... 370/395.54 |

* cited by examiner

*Primary Examiner*—Hong Cho
(74) *Attorney, Agent, or Firm*—W. Douglas Carothers, Jr.; Michael V. North; David L. Soltz

(57) ABSTRACT

A system, apparatus, and method for providing a plurality of internal VLANs within a networking element/node are described. Internal VLAN topologies are provisioned so that a particular VLAN(S) communicate traffic to corresponding applications. This segregation of internal traffic across a VLAN topology reduces the amount of interference between the traffic. Redundancy across the VLAN topology is provided so that traffic may be switched to another path in the event of a failure.

17 Claims, 6 Drawing Sheets

Peer VLAN Topology

VIRTUAL LOCAL AREA NETWORK CONFIGURATION FOR MULTI-CHASSIS NETWORK ELEMENT

CROSS REFERENCE TO RELATED PATENT APPLICATIONS

This application claims priority to U.S. Provisional Application Ser. No. 60/693,895, entitled "Virtual Local Area Network (VLAN) Configuration for Multi-Chassis and High Available Network Element", filed Jun. 24, 2005, which application is incorporated herein by reference in its entirety.

BACKGROUND

A. Technical Field

This application relates to network control management, and more particularly, to the use of virtual local area networks ("VLANs") within a multi-chassis network element to manage traffic therein.

B. Background of the Invention

The importance of networking technology in today's society is well understood. Communication networks have become a significant medium on which companies and individuals communicate. The types of information that are communicated on networks include voice, video, and data. The reliability of these networks is very important in day-to-day operations of many companies and individuals.

Network providers demand that networking elements within their networks operate with an extremely low failure rate. A network failure event may lead to a large amount of data being lost and may significantly impact the companies that rely on the network. These network failures may also cause financial losses to the network providers and require significant efforts to repair.

Network providers generally require that networks, and elements therein, maintain a layer of redundancy. To that end, network elements or nodes, such as routers and switches, typically standby components that may be activated to compensate for a failed component. In the case of such a failure, traffic may be diverted from a failed component to a corresponding standby component to allow traffic to continue to flow within the element. This redundancy effectively reduces the amount of damage caused by a failure within a network element.

Another important factor in reducing network failures is providing appropriate traffic management on the network element. This traffic management includes the internal switching and processing of network traffic from multiple ports to particular applications within the element. This management may be complicated by having particular network streams having different quality of service designations which may effectively prioritize one stream over another. For example, data traffic fault indication may be switched at a faster rate internally within the network element to ensure that data plane protection is happening in a timely manner. Traffic management may also provide routing or switching protocols within the network element to efficiently route traffic between ports on the element.

Different types of traffic within a network element may interfere with each other because of the different routing protocols/commands and the timing of these commands relative to each other. For example, traffic interference may occur if two different circuit packs attempt to simultaneously communicate with other circuit packs or applications. Also, broadcast traffic coming from a communication network is typically transported to a management/control module in the network node but may inadvertently be switched to another component, such as a line card, because of interfering commands at the switch.

Accordingly, what is needed is control management infrastructure within the internal control plane that prevents interference between circuit packs and provides a level of internal redundancy for traffic within the network element.

SUMMARY OF THE INVENTION

The present invention provides redundancy within the internal control plane of a network element and a reduction in traffic interference by deploying a plurality of VLANs within the network element. In one embodiment of the invention, the plurality of VLANs are provisioned in a multi-chassis network element node in order to control traffic on the control plane internal network and designed to provide redundancy within the element node. For example, the plurality of VLANs may provide at least two paths on which network traffic may be communicated between a port and an application or component, such as an internal processor(s).

In another embodiment of the invention, the plurality of VLANs may be partitioned so that certain VLANs control traffic to one application and other VLANs control traffic to another application. As a result, a VLAN may be designated to communicate a certain type of traffic to and/or from a particular application. This delineation among the plurality of VLANs reduces the occurrence of traffic interference because traffic from different applications is more effectively isolated from each other on the control plane of the network element.

The present invention may be implemented in various network elements, such as network switches and routers. For example, the invention may be integrated within a network switch or aggregator within an optical long-haul network. The plurality of VLANs may be located between a backplane and at least two processors within the network element. In such an environment, the invention provides internal redundancy behind the backplane and dynamic management of traffic within the control plane of the network element.

One skilled in the art will recognize that the present invention may also be applied to other networking elements and environments. Other implementations of the present invention include provisioning VLANs within a craft topology, a peer topology, and an optical service channel topology.

Other objects, features, and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus, and method for providing a plurality of internal VLANs within a networking element/node are described. Internal VLAN topologies are provisioned so that a particular VLAN(s) communicate traffic to corresponding applications. This segregation of internal traffic across a VLAN topology reduces the amount of interference between the traffic. Redundancy across the VLAN topology is provided so that traffic may be switched to another path in the event of a failure.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Figure 1:
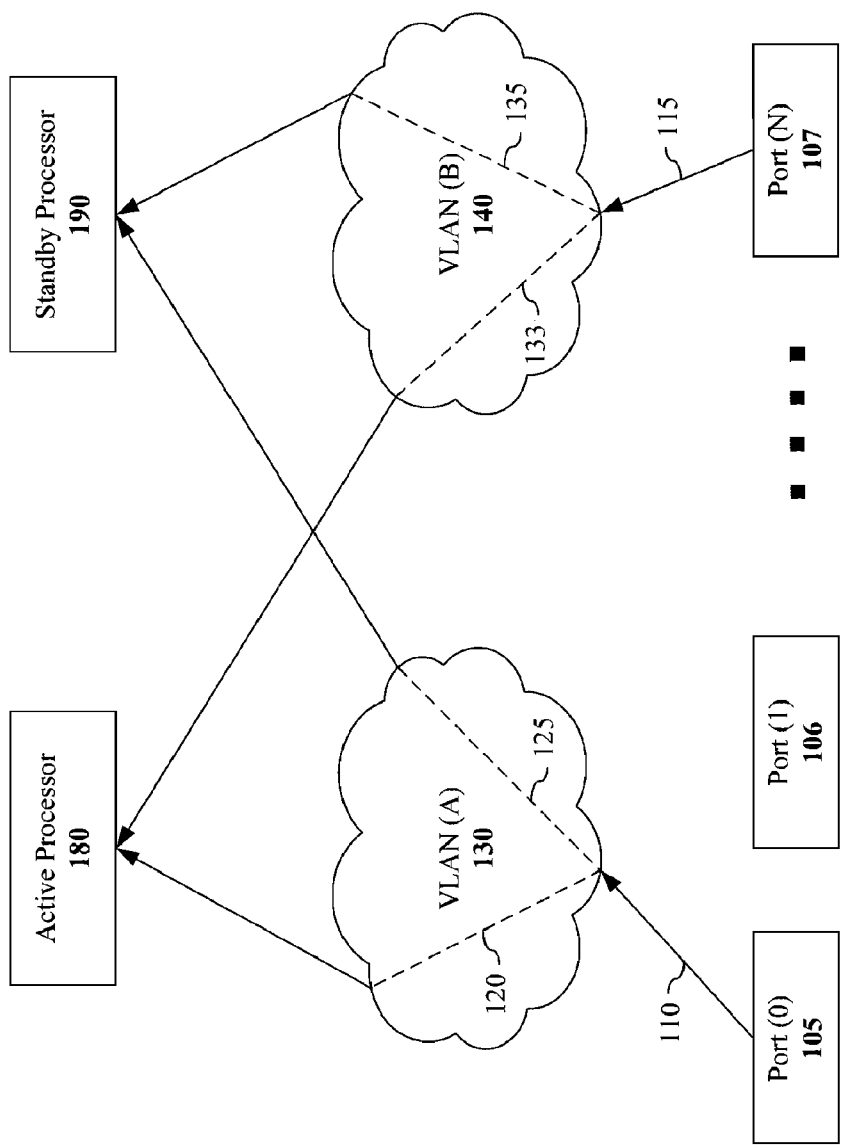
FIG. 1 is a general illustration of a plurality of VLANs that provide redundancy within a network element according to one embodiment of the invention.

FIG. 1 illustrates a general overview of a VLAN topology according to one embodiment of the invention. A plurality of ports or interfaces, in this example port (0) 105, port (1) 106 and port (N) 107, on one or more transceiver modules receive traffic that is to be internally processed within a network node. This processing may include switching, routing or aggregating network traffic. The plurality of ports are coupled to VLAN (A) 130 and VLAN (B) 140 that communicate the received traffic to either an active processor 180 or a standby processor 190. The standby processor may be activated in the event that the active processor 180 fails. One skilled in the art will recognize that the VLANs 130, 140 may also communicate traffic to other components within the network node and that various intermediary components, such as a backplane, may be located between the ports, VLANs, and processors.

In one embodiment of the invention, the internal physical network is partitioned into VLAN (A) 130 which communicates traffic for a first application, and VLAN (B) 140 which communicates traffic for a second application. This partitioning of the physical network into VLANs effectively separates traffic associated with different applications as each is communicated internally within a particular VLAN so that interference between this traffic is reduced. Traffic interference may occur if two different circuit packs attempt to communicate with other circuit packs or with one of the processors 180, 190 at the same time. As a further example, broadcast traffic coming from a communication network is typically transported to a management/control module in the network node but may inadvertently be switched to another component, such as a line card, because of interfering commands.

Each VLAN may also be provided a unique identifier to ensure that a correct VLAN is being addressed to communicate a particular type of traffic and ensure that the traffic is received at a correct destination. In this particular example, VLAN (A) 130 may receive signals from port (0) 105 and have a first path 120 to an active processor 180 and a second path 125 to a standby processor 190. VLAN (B) 140 receive signals from port (N) 107 and have a first path 133 to the active processor 180 and a second path 135 to the standby processor 190. The use of multiple VLANs separates the traffic on the control plane network between ports that may be communicated to the same application and provides redundancy within the internal signaling infrastructure.

One skilled in the art will recognize that the above-described principles may be applied to various networking environments and may be embodied in numerous topologies, some of which are described below.

B. Multi-Chassis Node Overview

Figure 2:
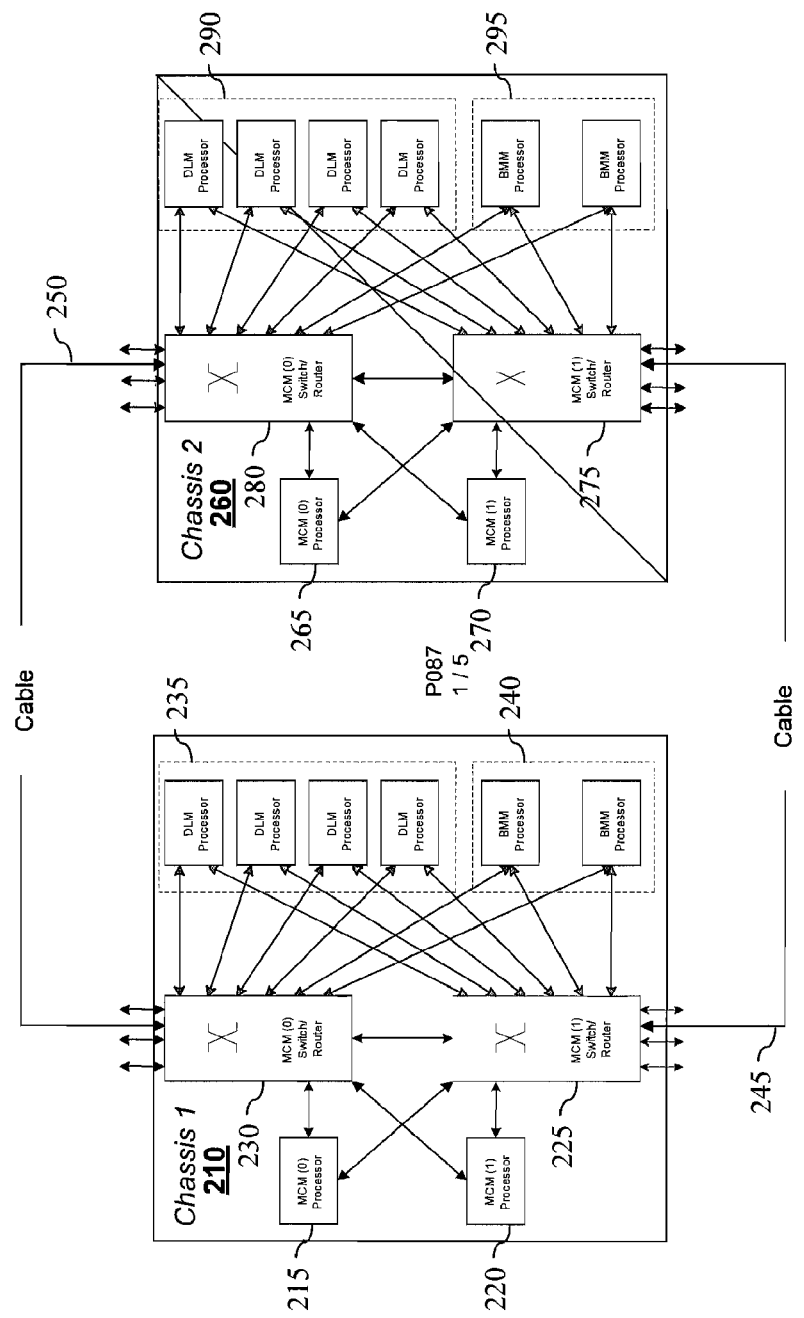
FIG. 2 is an illustration of a network element system having a plurality of VLANs within its control plane according to one embodiment of the invention.

FIG. 2 illustrates an exemplary multi-chassis node in which a plurality of internal VLANs may be employed according to one embodiment of the invention. In this particular example, the node comprises a first chassis 210 and a second chassis 260 that operate within a network node. The first chassis 210 comprises an active processor 215, such as the management control module ("MCM") processor, and a standby processor 220. The first chassis also includes signal band optical multiplexer and demultiplexer modules, such as the multiplexer/demultiplexer modules ("BMMs") 240, for banding or debanding of optical signal groups ("OCGs"). The first chassis 210 also includes a plurality of transceiver modules/line cards, such as the illustrated digital line modules ("DLM") 235, that are connected to the processors 215, 220 by one or more internal switches 225, 230.

These DLMs 235 may also interface with tributary adapter modules, ("TAMs"), which provide an interface between a client's signal equipment and a DLM. These modules are described in further detail in U.S. patent application Ser. No. 10/267,331, filed Oct. 8, 2001 and Ser. No. 11/154,455, filed Jun. 16, 2005, which applications are incorporated herein by their reference.

The second chassis 260 is structured in a similar manner to the first chassis 210 in that an active processor 265 and standby processor 270 are connected via internal switches 275, 280 to DLMs 290 and BMMs 295. The first chassis 210 and second chassis 260 are communicatively coupled by a first cable 245 and a second cable 250. Both the first and second chassis 210, 260 may also have other inputs including main network ports, craft ports, auxiliary network ports, and optical service channel ports.

In various embodiments of the invention, a plurality of VLANs are employed between circuit packs in transceiver modules in a network node, which may provide various functionality in a network including being a terminal end node or and add/drop node. The communication between the transceiver modules, and more particularly, intercommunication between the modules in multiple slots in a chassis or chasses environment is accomplished via Ethernet networking at the backplane of the modules.

In one embodiment of the invention, the first chassis 210 operates as a master chassis and is configured by a system user. Most network element configurations and activities are executed by the active node controller CPU. However, Ethernet switches on all MCMs are used to transport Ethernet/IP control plane traffic. See also pending provisional patent application, Ser. No. 60/695,393 entitled, "Time Synchronization for Redundant management control modules (MCMs) in Multi-chassis Network elements (NEs)," filed Jun. 30, 2005, which is incorporated herein by its reference, and also shows the arrangement of active and standby MCMs on a single chassis as shown in FIG. 2 as MCM(0) 215 and MCM (1) 220.

The Ethernet/IP control plane traffic is switched by an Ethernet switch in the management control module on each chassis 210, 260. The combination of the backplanes, control and timing cables, Ethernet switches, and network element provide an internal physical control plane network. A network element is configured for the flow of multiple VLANs. In one embodiment, each network element has two network ports connected to each MCM in the chassis. Because a network element is addressed with a single network IP address and the network element is managed by the active MCM (e.g., 215, 265), the network IP address is assigned to the active MCM, which may be either MCM(0) or MCM(1). However, the physical traffic may traverse into the active MCM through either the active MCM or the standby MCM depending upon which link port is connected to which MCM (e.g., MCM(0) or MCM(1)). For example, if both network links are operating and connected to a chassis at the same time, then the traffic will go through the active MCM.

a) Transceiver Module VLAN Topology

Figure 3:
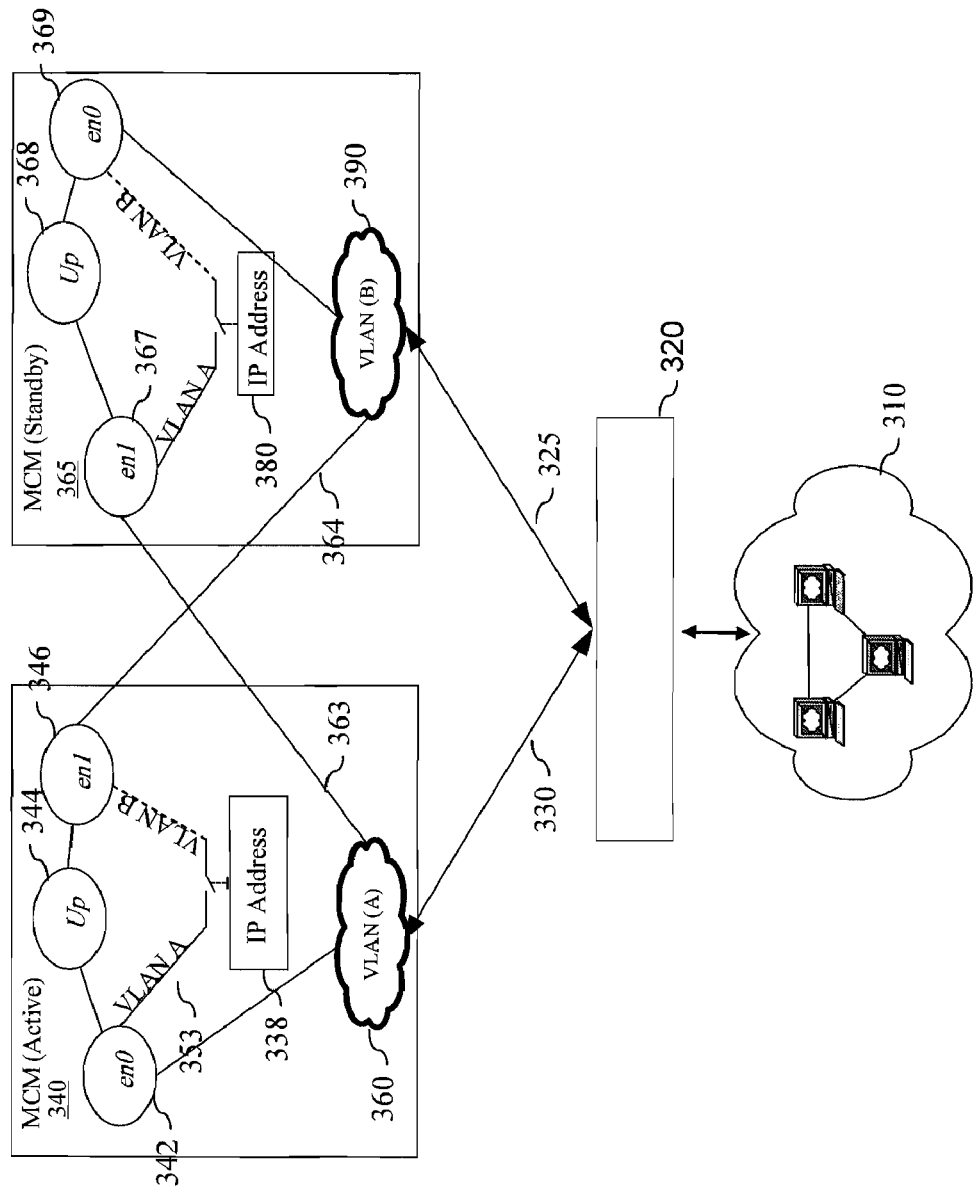
FIG. 3 illustrates a VLAN network traffic topology according to one embodiment of the invention.

FIG. 3 illustrates a network VLAN configuration topology according to one embodiment of the invention. A client network 310 is connected to a router 320 having a plurality of ports. A first MCM (active) 340 is coupled to the router 320 via connection 330 and a second MCM (standby) 365 is coupled to the router 320 via connection 325. The configuration provides redundant connections to both a first processor (µP) 344 on the first MCM 340 and a second processor 368 on the second MCM 365.

The first MCM 340 comprises a first switch including a first VLAN 360 that is coupled to a first MAC (en0) 342, on the first MCM 340, which is connected to the first processor 344. The second MCM 365 comprises a second switch including a second VLAN 390 that is coupled to a first MAC (en0) 369, on the second MCM 365, which is connected to the second processor 365.

A crosslink having a first connection 363 and a second connection 364 provides redundant connections to the first and second processors 344, 365. In one embodiment, this crosslink is an Ethernet crosslink having a first connection 363 that connects the first MCM switch VLAN 360 to a second MAC (en1) 367 on the second MCM 365 and a second connection 364 that connects the second MCM switch VLAN 390 to a second MAC (en1) 346 on the first MCM 340. These crosslink connections 363, 364 allow the sending and receipt of network traffic through the second (standby) MCM 365 to the first processor 344. This path through the second (standby) MCM 365 may operate as a redundant path in the case of a failure.

An exemplary Ethernet switch configuration for the network is shown below. Each network element has two main network ports and two separate VLANs, (e.g., 360, 390) for each network port.

| VLAN | Slot A Switch | Slot A CPU | Slot B Switch | Slot B CPU |
| --- | --- | --- | --- | --- |
| VLAN B | NetworkPort, MCMProcPort, | en0 | | en1 |

-continued

| VLAN | Slot A Switch | Slot A CPU | Slot B Switch | Slot B CPU |
| --- | --- | --- | --- | --- |
| VLAN A | PeerMcmPort | en1 | NetworkPort, MCMProcPort, PeerMcmPort | en0 |

In one embodiment, the network element has a single network IP address 355 that defines the interface for management traffic, which may require that this address be switched to the active MCM when a redundancy switching occurs.

An active MCM will be assigned the network IP address. A network port is continuously monitored by the MCMs 340, 365 for their link status. At boot up, the network IP address 355 is assigned to the first MAC 342 over VLAN A interface 353. This interface is directly connected to the switch VLAN 360. In one embodiment, the switch VLAN A 360 is configured with CPC PROC port, peer MCM CPC port and network port which will be part of the DCN VLAN on a first card. The switch VLAN B 390 is configured with CPC PROC port, peer MCM CPC port and network port which will be part of the DCN VLAN on the second MCM 365.

When a network link on the active MCM is detected to be down, the DCN IP address 355 is switched from the first MAC 342 to a second MAC 346 over to VLAN B 390. The second MAC 346 interface is connected to the secondary or standby MCM's switch VLAN B 390 via crosslink communication line 364 so that the IP address is stored 380 in the second MCM 365, which also is in communication with the network port. With activation of this switch, the traffic will start flow through the standby MCM 365.

The network IP address may be auto-reverted back to the first MAC 342 over VLAN A interface 353 (i.e. active MCM 340) when the network link status on the active MCM 340 is detected to be up, this will avoid the need for monitoring the crosslink on the standby MCM 365 from the active MCM 340 which could cause the software in the network element to generate errors.

The VLAN topology may also be applied to auxiliary or DCN ports on the first chassis 210 and the second chassis 260. In one embodiment, each network element has two auxiliary ports, one port being connected to the active MCM 340 and a second port being connected to the standby MCM 365. The auxiliary network may be configured in a similar fashion described above in relation to transceiver module VLAN topology but having a different VLAN and IP address. An exemplary switch configuration for the auxiliary or DCN network is shown below.

| VLAN | Slot A Switch | Slot A CPU | Slot B Switch | Slot B CPU |
| --- | --- | --- | --- | --- |
| VLAN A | AuxPort, MCMProcPort, PeerMcmPort | en0 | | en1 |
| VLAN B | | en1 | AuxPort, MCMProcPort, PeerMcmPort | en0 | b) Craft VLAN Topology

Figure 4:
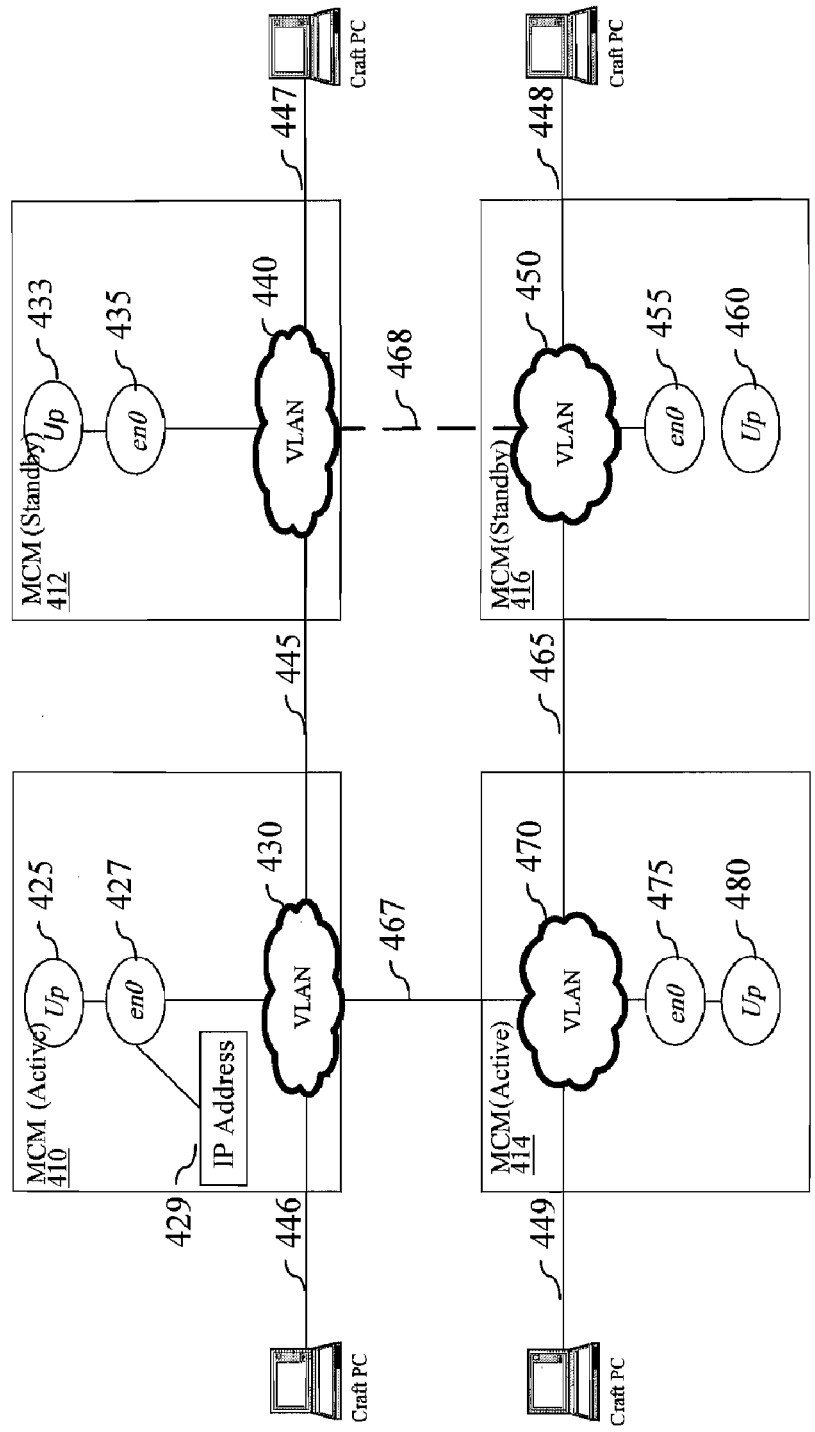
FIG. 4 illustrates a craft VLAN topology according to one embodiment of the invention.

FIG. 4 illustrates a multiple VLAN topology within a craft environment according to one embodiment of the invention. In this example, a first active MCM 410 comprises a craft interface 446 that is coupled to VLAN A 430 which is coupled to a first MAC 427 and a first microprocessor 425. A first standby MCM 412 comprises a craft interface 447 that is coupled to VLAN B 440 which is coupled to a second MAC 435 and a second processor 433. A second active MCM 414 comprises a craft interface 449 coupled to VLAN C 470 which is coupled to a third MAC 475 and a third processor 480. A second standby MCM 416 comprises a craft interface 448 coupled to VLAN D 450 which is coupled to a fourth MAC 455 and fourth processor 460.

In a multi-MCM configuration, span tree connection may run between the chassis shelves to ensure a loop tree craft VLANs topology. Inter-communication between the MCMs is provided by connections between the VLANs. As shown, VLAN A 430 can communicate with VLAN B 440 via link 445 and can communicate with VLAN C 470 via link 467. VLAN C 470 can communicate with VLAN D 450 via link 465. An optional link 468 can provide communication between VLAN B 440 and VLAN D 450. These inter-communication links provide redundancy within the node and allows a system user to access each of the MCMs from a single craft port.

In one embodiment, each chassis has two craft ports that are inputs to the Ethernet control management system. An active node controller is configured with a particular craft IP address 429 and is coupled to VLAN A 430, which effectively allows access to the other MCMs within the topology via the various inter-communication links.

Various control methodologies may be employed including requiring that all packets are switched to the active node controller MCM and terminated into the corresponding processor regardless of where the craft PC is connected. A craft port IP address may have local significance only if remote network elements need to be accessed. This access may be performed through a gateway network element.

communication is provided by multiple peer-to-peer links between the MCMs. In one embodiment of the invention, there are three different physical paths on which Peer MCMs can communicate with each other.

A first path 533 connects a third MAC 525, having an associated IP address 530, on MCM(0) to VLAN B 540. A second path 535 connects a fourth MAC 565, having an associated IP address 575, on MCM(1) to VLAN A 510. A third path 518 connects VLAN A 510 and VLAN B 540. These paths 518, 533, 535 provide peer-to-peer communication between MCM(0) and MCM(1), and redundancy if a failure should occur along one of these paths. Each path may be configured as a particular VLAN and IP interface and the peer negotiation and database replication Ethernet traffic is running on this particular VLAN may have a unique assigned IP address.

In one embodiment, the third path 518 communicates through an Ethernet link between two switches associated with VLAN A 510 and VLAN B 540, with a final communication through the second MAC 545 on MCM(1). This third path 518 may be under a backplane VLAN which is shared by multiple transceiver modules/cards in a network element. "Keep alive" and "Mo-Co" traffic between MCM(0) and MCM(1) may be communicated through this backplane VLAN. "Keep alive" traffic is a life monitoring mechanism for the network element in which MCMs communicate messages periodically to each other to verify that peers are operating correctly. "Mo-Co" traffic is network element configuration updates. A more detailed description of the backplane VLAN is provided later.

An exemplary Ethernet switch configuration for a peer network is shown below.

| VLAN | Slot A Switch | Slot A CPU | Slot A IP Address | Slot B Switch | Slot B CPU | Slot B IP Address |
| --- | --- | --- | --- | --- | --- | --- |
| VLAN A | MCMProcPort, PeerMcmPort | en0 | 127.4.1.122 | | en1 | 127.4.1.123 |
| VLAN B | | en1 | 127.5.1.122 | MCMProcPort, PeerMcmPort | en0 | 127.5.1.123 |

An exemplary Ethernet switch configuration for a craft network is shown below.

| VLAN | MCM Switch | Node Controller CPU |
| --- | --- | --- |
| VLAN A | CraftPort, MCMProcPort, NCT1Port, NCT2Port, PeerMcmSwitchPort | en0 | c) Peer VLAN Toplogy

Figure 5:
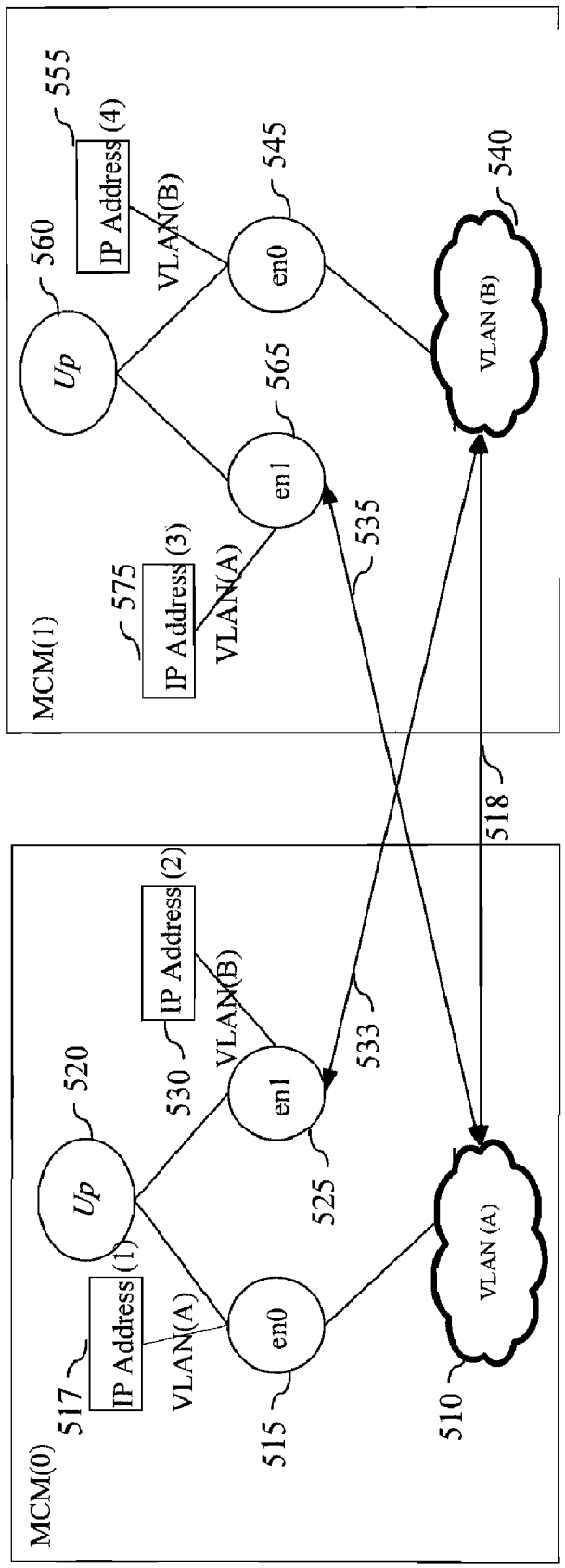
FIG. 5 illustrates a peer VLAN topology according to one embodiment of the invention.

FIG. 5 illustrates a peer VLAN topology between transceiver modules according to one embodiment of the invention. MCM(0) comprises a VLAN A 510 coupled to a first MAC 515 having an associated first IP address 517 and being coupled to a first processor 520. MCM(1) comprises a VLAN B 540 coupled to a second MAC 545 having an associated second IP address 555 and being coupled to a second processor 560.

The first and second VLANs 510, 540 allow for peer-to-peer communication between the MCMs. Redundancy of this d) Backplane VLAN In one embodiment of the invention, a backplane VLAN is the largest VLAN within a network element node. It may be used for all the circuit packs on multiple chasses to communicate with each other. The ports on the MCM Ethernet switch, except external ports and the peer MCM port, may be assigned to this backplane VLAN.

There may be several IP subsets installed on the backplane VLAN that allow transceiver modules, such as DLMs, to communicate with other modules using the Ethernet switch on a local active MCM that is on the same chassis. For example, a first subset of IP addresses is used by the modules to communicate with other modules using the switch or VLAN on a first local module, such as the MCM(0), that is on the same chassis. A second subset of IP addresses may used by the modules to communicate with other modules using the switch or VLAN on a second local module, such as the MCM (1), that is on the same chassis. Other subsets of IP addresses may be used as floating IP addresses for an active MCM for use at anytime. Yet another subset of IP addresses may be used as floating IP addresses for a standby MCM use at anytime. A table below shows an exemplary switch combination for the backplane VLAN.

| VLAN | Ethernet Switch | CPU | Slot A IP Address | Slot B IP Address | Active IP Address | Standby IP address |
|---|---|---|---|---|---|---|
| Backplane VLAN | NCT1Port, DLM4Port, DLM3Port, BMM1ProcPort, NCT2Port, DLM6Port, DLM5Port, BMM2ProcPort, MCMProcPort, PeerMcmSwitchPort | en0 | 127.1.x.122 127.2.x.122 | 127.1.1.123 127.3.x.122 | 127.254.x.1 | 127.254.x.2 | e) Optical Service Channel VLAN Topology

Figure 6:
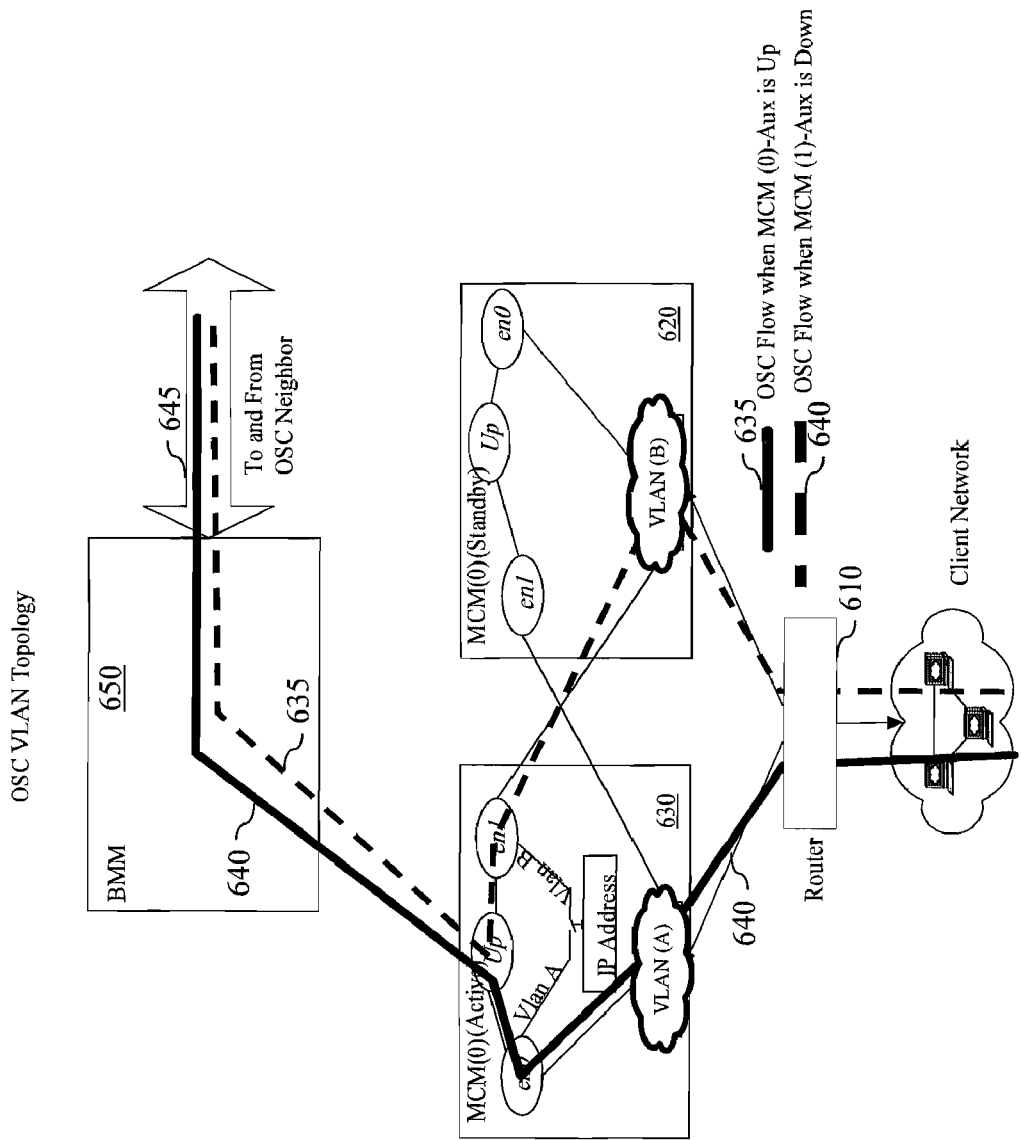
FIG. 6 illustrates an optical service channel VLAN topology according to one embodiment of the invention.

FIG. 6 illustrates an exemplary optical service channel ("OSC") VLAN topology according to one embodiment of the invention. OSCs are optical channels that may be used within a network element to interconnect chasses so that data may be communicated between the chasses. In one example, the OSCs are a SONET OC-3c link with Ethernet frames encapsulated inside its payload.

In one embodiment of the invention, each transceiver module has an OSC link to other modules within a network element node. For example, a BMM 650 may have an OSC link 645 to neighboring BMMs on other devices. Additionally, a network element may have one or more OSC interfaces on which it transmits and receives information.

OSC packets may be communicated between transceiver modules using various methods. In one method, as illustrated in FIG. 6, an OSC VLAN topology is provided to allow OSC communication to occur as well as to enable redundant paths in case a failure occurs. OSC packets are forwarded from an OSC framer to an active node controller in an MCM. A plurality of VLANs is provided that create at least two paths between an OSC optical link and a port for routing.

Referring to FIG. 6, a first path 635 and a second path 640 are provided between an OSC optical link and router 610. The first path 635 uses VLAN A on the active MCM 630 to switch to traffic to the router 610 and the second path 640 uses VLAN B on the standby MCM 620 to switch traffic to the router 610. Using the two paths, redundancy is created across the active and standby MCMs.

An OSC digital framer receives OSC traffic from an optical link 645 via a transceiver or line card module that includes a BMM 650. The OSC traffic is forwarded to a switch in the BMM 650, which forwards the OSC traffic to the active shelf controller switch.

The active shelf controller switch forwards traffic to the active node controller switch which forwards the traffic to a processor for routing. On the node controller processor, an IP address can be defined by a user for each OSC VLAN. IP packets may also routed to different OSCs using software on the controller processor.

The OSC traffic may be routed back to another OSC by reversing the above-described steps and then forwarded to another network. This topology allows both auxiliary and network traffic to be forwarded throughout the internal network of the network element node.

As described above, a VLAN is created on all the MCM Ethernet switches for each OSC. In one embodiment of the invention, a VLAN ID for each OSC is based on a formula of Shelf ID and Slot ID: OSC VLAN ID=Slot Id*256+Shelf Id

| VLAN | MCM Switch on Shelf X | MCM Switch other than Shelf X | Node Controller CPU |
|---|---|---|---|
| VALAN 256 + X | OSC1, MCMProcPort, NCT1Port, NCT2Port, PeerMcmSwitchPort | MCMProcPort, NCT1Port, NCT2Port, PeerMcmSwitchPort | en0 |
| VLAN 512 + X | OSC2, MCMProcPort, NCT1Port, NCT2Port, PeerMcmSwitchPort | MCMProcPort, NCT1Port, NCT2Port, PeerMcmSwitchPort | en0 |

While various embodiments of the present invention have been described above, it should be understood that they have been presented by way of examples, and not limitation. It will be apparent to persons skilled in the relevant art that various changes in form and detail may be made therein without departing from the spirit and the scope of the invention.

We claim:

1. A network element node comprising:
 a plurality of network ports on which network traffic is received and transmitted;
 a switch, coupled to the plurality of network ports, that switches the network traffic to components within the network element node;
 a first virtual local area network ("VLAN"), located on the switch, having an associated first network port within the plurality of network ports and that switches at least a first portion of the network traffic to a first one of the components;
 a second VLAN, located on the switch, having an associated second network port within the plurality of network ports and that switches at least a second portion of the network traffic to a second one of the components;
 a first transceiver module;
 a second transceiver module, wherein the first VLAN is located on the first transceiver module and the second VLAN is located on the second transceiver module;
 a first MAC, located on the first transceiver module and coupled to the first VLAN, on which a third portion of the network traffic is received, the first MAC being associated with a first IP address; and
 a second MAC, located on the second transceiver module and coupled to the first VLAN, on which a fourth portion of the network traffic is received, the second MAC being associated with a second IP address, the fourth portion of the network traffic being diverted to the second MAC in the event of a failure, wherein the first VLAN includes a first redundant path to the second one of the components and the second VLAN includes a second redundant path to the first one of the components, and wherein the first and second IP addresses are the same address and the second IP address is updated in the event of a failure on the first transceiver module.

2. The network element node of claim 1 wherein the first one of the components is an active processor and the second one of the components is a standby processor.

3. The network element node of claim 1 wherein the network element node is a multi-chassis system.

4. The network element node of claim 1 wherein the network element node operates in a long-haul optical network and the switch is an Ethernet switch.

5. The network element node of claim 1 wherein the first and second VLANs operate in transceiver module VLAN topology.

6. A network element comprising:
a plurality of transceiver modules, within a network element node, that transmit and receive network traffic;
a first craft port, on a first transceiver module within the plurality of transceiver modules, on which a craft personal computer may interface and communicate with the network element node;
a first VLAN, located on a switch within the first transceiver module, that receives information from the first craft port;
a second VLAN, located on a second transceiver module within the plurality of transceiver modules, that receives the information from the first VLAN to enable a user to communicate with the second transceiver module;
a third VLAN, located on a third transceiver module within the plurality of transceiver modules, that receives the information from the first VLAN to enable a user to communicate with the third transceiver module;
a first MAC, located on the first transceiver module and coupled to the first VLAN, on which a third portion of the network traffic is received, the first MAC being associated with a first IP address; and
a second MAC, located on the second transceiver module and coupled to the first VLAN, on which a fourth portion of the network traffic is received, the second MAC being associated with a second IP address, the fourth portion of the network traffic being diverted to the second MAC in the event of a failure,
wherein the first and second IP addresses are the same address and the second IP address is updated in the event of a failure on the first transceiver module.

7. The network element of claim 6 wherein the first VLAN, the second VLAN and third VLAN communicate using Ethernet inter-communication connections.

8. A network element comprising:
a first transceiver module;
a second transceiver module;
a first VLAN, located on a first switch within the first transceiver module, that receives network traffic from a client network;
a second VLAN, located on a second switch within the second transceiver module, that receives network traffic from the client network;
a first MAC, located on the first transceiver module and having an associated first IP address, that communicates with the second VLAN via a first peer-to-peer link; and
a second MAC, located on the second transceiver module and having an associated second IP address, that communicates with the first VLAN via a second peer-to-peer link;
wherein the first and second IP addresses are the same address and the second IP address is updated in the event of a failure on the first transceiver module.

9. The network element of claim 8 further comprising a third peer-to-peer link that couples the first VLAN to the second VLAN.

10. The network element of claim 9 wherein the third peer-to-peer link is under a backplane VLAN which is shared by the first and second transceiver modules.

11. The network element of claim 10 wherein the backplane VLAN is associated with a plurality of IP subset addresses that allow communication between the first and second transceiver modules.

12. A network element comprising:
a banding/debanding module that receives or transmits optical signal groups;
a first transceiver module including a first VLAN, the first transceiver module being coupled to the banding/debanding module, the first transceiver module receives and switches, with the first VLAN, first traffic carried by first ones of the optical signal groups;
a second transceiver module including a second VLAN, the second transceiver module being coupled to the first transceiver module, the second transceiver module receives and switches, with the second VLAN, second traffic carried by second ones of the optical signal groups;
a first MAC, located on the first transceiver module and coupled to the first VLAN, on which a third portion of the network traffic is received, the first MAC being associated with a first IP address; and
a second MAC, located on the second transceiver module and coupled to the first VLAN, on which a fourth portion of the network traffic is received, the second MAC being associated with a second IP address, the fourth portion of the network traffic being diverted to the second MAC in the event of a failure,
wherein the first and second IP addresses are the same address and the second IP address is updated in the event of a failure on the first transceiver module.

13. A method for providing redundancy and network traffic segregation within a multi-chassis network node, the method comprising:
receiving a first network stream on a first port;
receiving a second network stream on a second port;
switching the first network stream on a first VLAN to an active component within the multi-chassis network node;
switching the second network stream on a second VLAN to the active component within the multi-chassis network node;
maintaining a first connection of a first redundant path in the first VLAN to a standby component within the multi-chassis network node; and
maintaining a second connection of a second redundant path in the second VLAN to the standby component within the multi-chassis node,
wherein each of a plurality of MACs has a corresponding one of a plurality of IP addresses that allow the switching of the first network stream and the switching of the second network stream, first and second ones of the plurality of IP addresses being the same address and the second one of the plurality of IP addresses is updated in the event of a failure on the first transceiver module.

14. The method of claim 13 wherein the active component is an active processor and the standby component is a standby processor.

15. The method of claim 13 wherein the first port is a craft interface port that allows a craft PC to communicate with a first chassis within the multi-chassis network node.

16. The method of claim 15 wherein the active component and the standby component are located on a second chassis within the multi-chassis network node.

17. The method of claim 13 wherein a communication between the first VLAN and the second VLAN occurs under a backplane VLAN associated with the multi-chassis network node.

* * * * *